(12) United States Patent
Imai (10) Patent No.: US 9,060,110 B2
(45) Date of Patent: Jun. 16, 2015

(54) IMAGE CAPTURE WITH TUNABLE POLARIZATION AND TUNABLE SPECTRAL SENSITIVITY

(75) Inventor: Francisco Imai, Mountain View, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 662 days.

(21) Appl. No.: 13/269,537

(22) Filed: Oct. 7, 2011

(65) Prior Publication Data

US 2013/0088612 A1 Apr. 11, 2013

(51) Int. Cl.
| H04N 5/225 | (2006.01) |
| H04N 5/238 | (2006.01) |
| H04N 9/04 | (2006.01) |

(52) U.S. Cl.
CPC ............. *H04N 5/2254* (2013.01); *H04N 5/238* (2013.01); *H04N 9/045* (2013.01)

(58) Field of Classification Search
None
See application file for complete search history.

(56) References Cited

U.S. PATENT DOCUMENTS

| 6,466,961 | B1 | 10/2002 | Miller |
| 6,760,475 | B1 | 7/2004 | Miller |
| 6,985,216 | B2 | 1/2006 | Treado et al. |
| 7,274,454 | B2 | 9/2007 | Kowarz et al. |
| 7,342,658 | B2 | 3/2008 | Kowarz et al. |
| 7,652,699 | B2 | 1/2010 | He et al. |
| 2003/0098918 | A1 | 5/2003 | Miller |
| 2005/0117045 | A1* | 6/2005 | Abdellatif et al. ............. 348/335 |
| 2006/0054780 | A1* | 3/2006 | Garrood et al. ............. 250/208.1 |
| 2009/0027518 | A1* | 1/2009 | Kita .......................... 348/231.99 |
| 2010/0044822 | A1 | 2/2010 | Longoni et al. |
| 2010/0290713 | A1* | 11/2010 | Kanamori et al. ............. 382/254 |
| 2011/0228895 | A1* | 9/2011 | Ridley et al. ...................... 378/2 |

FOREIGN PATENT DOCUMENTS

| WO | WO2007126412 | * 11/2007 |
| WO | WO2010063991 | * 6/2010 |

OTHER PUBLICATIONS

U.S. Appl. No. 12/949,592, filed Nov. 18, 2010, by Francisco Imai.
Poger et al., "Multispectral Sensors in Computer Vision", Stevens Institute of Technology, CS Report 2001-3 (Aug. 28, 2001).
Nayar et al., "Separation of Reflection Components Using Color and Polarization", International Journal of Computer Vision vol. 21, Issue 3 (1997).
Schechner et al., "Polarization-based Vision Through Haze", Applied Optics 42, No. 3, 51-525 (2003).
Schechner et al., "Recovery of Underwater Visibility and Structure by Polarization Analysis", IEEE Journal of Oceanic Engineering 30, 3, 570-587 (2005).

(Continued)

*Primary Examiner* — Albert Cutler
(74) *Attorney, Agent, or Firm* — Fitzpatrick, Cella, Harper & Scinto (57) ABSTRACT

Image capture using an image capture device that includes an imaging assembly having a spectral sensitivity tunable in accordance with a spectral capture mask, and imaging optics having a polarization filter tunable in accordance with a polarization control mask for projecting an image of a scene onto the imaging assembly. A default polarization control mask is applied to the imaging optics, and a default spectral capture mask is applied to the imaging assembly. An image of the scene is captured using the imaging assembly.

25 Claims, 6 Drawing Sheets

(56) References Cited

OTHER PUBLICATIONS

Longoni et al., "The Transverse Field Detector (TFD): A Novel Color-Sensitive CMOS Device", IEEE Electron Device Letters 29, 1306-1308 (2008).

Kang et al., "A Tunable Carbon Nanotube Polarizer", Nanotechnology, vol. 21 (2010).

Liu et al., "Tunable Field-Sensitive Polarizer Using Hybrid Conventional Waveguides and Photonic Crystal Structures with Nematic Liquid Crystals", Optics Communications, vol. 256, pp. 114-122 (2005).

* cited by examiner

IMAGE CAPTURE WITH TUNABLE POLARIZATION AND TUNABLE SPECTRAL SENSITIVITY

FIELD

The present disclosure relates to image capture, and more particularly relates to image capture with polarization filtering.

BACKGROUND

Polarization is a property of electromagnetic waves, such as light, that describes the orientation of oscillations. When light propagates in free space, it generally propagates as a transversal wave having a polarization perpendicular to the direction of travel of the light wave. When light is reflected at shallow angles, the light wave is typically polarized to some degree, which often increases glare.

Polarization filters can be used to convert a beam of light having undefined or mixed polarization into a beam of light having well-defined polarization. Such polarization filters can be used to improve image capture, to enhance vision, and to improve the performance of vision algorithms for segmentation, shape and motion estimation. For example, polarization filters are often used to separate between diffuse reflection and specular reflection. See S. K. Nayar et al., "Separation of Reflection Components Using Color and Polarization", International Journal of Computer Vision Volume 21, Issue 3 (1997), Y. Y. Schechner et al., "Polarization-based Vision Through Haze", Applied Optics 42, No. 3, 51-525 (2003), and Y. Y. Schechner et al., "Recovery of Underwater Visibility and Structure by Polarization Analysis", IEEE Journal of Oceanic Engineering, 30, 3, 570-587 (2005).

SUMMARY

Spectral imaging systems, having more spectral bands than the typical three bands of the human eye, enable recognition of the ground-truth of materials in an imaged scene, by identifying the spectral fingerprint that is unique to each material.

Recently, imaging assemblies have been developed in which the imaging assemblies have a tunable spectral response. Two examples of such imaging assemblies are described here. In the first example of imaging assemblies which have a tunable spectral response, there are imaging assemblies where the image sensor itself has a tunable spectral response. For instance, there is an image sensor described in "The Transverse Field Detector: A Novel Color Sensitive CMOS Device", Zaraga, IEEE Electron Device Letters 29, 1306-1308 (2008) and U.S. Patent Publication No. 2010/0044822, the contents of which are incorporated herein by reference. These documents describe a transverse field detector (TFD) which has a tunable spectral responsivity that can be adjusted by application of bias voltages to control electrodes. Each pixel outputs signals for a red-like channel, a green-like channel, and a blue-like channel.

In some of these image sensors, the spectral responsivity is tunable globally, meaning that all pixels in the image sensor are tuned globally to the same spectral responsivity.

In some others of these image sensors, the spectral responsivity is tunable on a pixel by pixel basis or a region-by-region basis. Bias voltages are applied in a grid-like spatial mask, such that the spectral responsivity of each pixel is tunable individually of other pixels in the image sensor, or such that the spectral responsivity of each region comprising multiple pixels is tunable individually of other regions in the image sensor.

In the second example of imaging assemblies that have a tunable spectral response, there are imaging assemblies where the image sensor is preceded by a color filter array (CFA), and it is the color filter array that has a tunable spectral response. In the first example described above, because the image sensor itself has a tunable spectral response, it might be customary to omit a preceding color filter array, since the inclusion of any filter necessarily would decrease the signal-to-noise ratio by filtering the amount of light incident on the image sensor. In contrast, in this second example, the spectral responsivity of the image sensor is not necessarily tunable, but the spectral responsivity of a preceding color filter array is. For instance, there is a tunable color filter array described in U.S. Pat. No. 6,466,961 by Miller, "Methods for Adaptive Spectral, Spatial and Temporal Sensing for Imaging Applications", the content of which is incorporated herein by reference. This document describes an imaging assembly comprising a color filter array which precedes an image sensor whose spectral responsivity is constant, but in which the color filter array itself has a tunable spectral responsivity that can be adjusted by application of bias voltages to control electrodes. Each array element thus filters light incident on corresponding pixels of the image sensor, and the image sensor thereafter outputs signals from which a red-like channel, a green-like channel, and a blue-like channel, can all be derived for each pixel. In the case of a color filter array with temporal sensing, the channels for each pixel may be output sequentially, one after the other. In the case of a color filter array with spatial sensing, the channels for each pixel may be output simultaneously or nearly so, although demosaicing might be required depending on the geometry of the color filter array.

A spatial mosaic can be constructed using tunable color filters on top of individual imaging sensors. A Bayer-type mosaic provides color filters tuned to provide three channels distributed spatially. The number of channels can be increased beyond three by tuning color filters to provide four, five or more channels distributed spatially. There is a trade-off between spectral resolution, which is determined by the number of channels, and spatial resolution. However, by increasing the number of pixels of an image sensor, the visual effect of loss in spatial resolution can be minimized. An increased complexity of the spatial mosaic typically requires more complex demosaicing procedures as well as larger spatial filters for demosaicing.

In some of these color filter arrays, the spectral response is tunable globally, resulting in a situation where corresponding channels for all pixels in the image sensor are tuned globally to the same responsitivity.

In some others of these color filter arrays, the spectral responsivity is tunable on a pixel by pixel basis or a region-by-region basis. Bias voltages are applied in a grid-like spatial mask, such that the spectral responsivity for each pixel is tunable individually of other pixels, or such that the spectral responsivity of each region comprising multiple pixels is tunable individually of other regions in the image sensor.

In development efforts separate from the foregoing developments, imaging optics have been developed in which the imaging optics have a tunable polarization filtering. Two examples of such imaging optics are described here. The first example of imaging optics which have a tunable polarization is based on carbon nanotubes, and is described by Kang et al., "A Tunable Carbon Nanotube Polarizer", Nanotechnology, Vol. 21 (2010), the content of which is incorporated herein by reference. The second example is based on photonic crystals, and is described by Liu, et al., "Tunable Field-Sensitive Polarizer Using Hybrid Conventional Waveguides and Photonic Crystal Structures with Nematic Liquid Crystals", Optics Communications, Vol. 256, pp. 114-122 (2005), the content of which is incorporated herein by reference. Both of these technologies are examples of polarizing filters having polarization characteristics tunable in accordance with a polarization parameter. The polarization characteristic typically would include the angular direction of polarization.

Often, when using a typical polarization filter, there is an undesirable reduction in light transmittance due to the filter, such that the captured image is darker than an image captured without polarization filtering. In addition, when using such a polarization filter with a spectral imaging device, the light transmittance is further reduced due to the narrow band filtering needed for spectral imaging. Moreover, light transmittance is often also reduced by the use of multiple filters.

The foregoing situation is addressed by performing diffuse spectral imaging using an image capture device that includes an imaging assembly having a tunable spectral sensitivity and a tunable polarization.

Thus, according to an aspect of the disclosure herein, an image capture device includes an imaging assembly having a spectral sensitivity tunable in accordance with a spectral capture mask, and imaging optics having a polarization filter tunable in accordance with a polarization control mask for projecting an image of a scene onto the imaging assembly. A default polarization control mask is applied to the imaging optics. A default spectral capture mask is applied to the imaging assembly. An image of the scene is captured using the imaging assembly.

According to another aspect of the disclosure herein, an image capture device includes an imaging assembly having a spectral sensitivity tunable in accordance with a spectral capture mask, and imaging optics having a polarization filter tunable in accordance with a polarization control mask for projecting an image of a scene onto the imaging assembly. A default polarization control mask is applied to the imaging optics, the default polarization control mask controlling the imaging optics so as to implement a 90° polarization filter. A default spectral capture mask is applied to the imaging assembly, the default spectral capture mask controlling the imaging assembly to produce a spatially uniform response when illuminated by a perfectly diffuse illumination. At least one sample image of the scene is captured using the imaging assembly, and a polarization adjustment is determined based at least in part on calculations using the sample image, so as to determine a polarization angle for suppression of specular reflection. An updated polarization control mask is constructed based at least in part on calculations using the polarization adjustment. Multiple different regions in the scene are identified, each such region sharing similar spectral content that is dissimilar from spectral content in other regions of the scene, at least in part on calculations using the sample image. Spectral bands for each region of the multiple different regions are determined, the spectral bands being determined so as to increase spectral differentiation for spectral content in each such region. An updated spectral capture mask is constructed based at least in part on calculations using the spectral bands for the multiple different regions. The updated polarization control mask is applied to the imaging optics, and the updated spectral capture mask is applied to the imaging assembly. An image of the scene is captured, the image of the scene being captured with the updated polarization control mask applied to the imaging optics and with the updated spectral capture mask applied to the imaging assembly.

By virtue of such arrangements, spectral differentiation can be increased for spectral content in each of multiple different regions, as opposed to increasing spectral differentiation for a single region or increasing spectral differentiation globally for the entire scene. Moreover, it is possible to increase spectral differentiation while also adjusting polarization such that light transmittance is increased.

In some example embodiments, at least one sample image of the scene is captured, and spectral content of the scene is estimated based on the captured sample image. According to these embodiments, an updated polarization control mask and an updated spectral capture mask are constructed based at least in part on calculations using the estimated spectral content of the scene. The updated polarization control mask is applied to the imaging optics, and the updated spectral capture mask is applied to the imaging assembly. The image of the scene is captured with the updated polarization control mask applied to the imaging optics and with the updated spectral capture mask applied to the imaging assembly.

In some example embodiments, in estimating spectral content of the scene, the captured sample image of a scene is used to estimate the spectral image based on pre-calculated basis vectors and transformations from digital signals to reflectance spectra. According to some of these example embodiments, the basis vectors are eigenvectors.

In one example embodiment, at least one sample image of the scene is captured, and a polarization adjustment is determined based at least in part on calculations using the sample image. An updated polarization control mask is constructed based at least in part on calculations using the polarization adjustment, and multiple different regions in the scene are identified. Each such region shares similar spectral content that is dissimilar from spectral content in other regions of the scene, at least in part on calculations using the sample image. Spectral bands for each region of the multiple different regions are determined, the spectral bands being determined so as to increase spectral differentiation for spectral content in each such region. An updated spectral capture mask is constructed based at least in part on calculations using the spectral bands for the multiple different regions. The updated polarization control mask is applied to the imaging optics, and the updated spectral capture mask is applied to the imaging assembly. In the capture step, the image of the scene is captured with the updated polarization control mask applied to the imaging optics and with the updated spectral capture mask applied to the imaging assembly.

According to some example embodiments, the spectral capture mask tunes the imaging assembly to a spectral sensitivity having high spectral dimensionality with more than three spectral components.

In one example embodiment, the imaging assembly comprises an image sensor that has a tunable spectral response. In another example embodiment, the imaging assembly comprises an image sensor and a preceding color filter array which has a tunable spectral response.

According to one example embodiment, the imaging optics is comprised by a tunable carbon nanotube polarizer. According to another example embodiment, the imaging optics is comprised by a tunable field-sensitive polarizer using hybrid waveguides and photonic crystal structures with nematic liquid crystals.

According to some example embodiments, the imaging assembly is comprised of an array of pixels, and the imaging optics is comprised of adjustable micro-polarizers on top of each pixel.

This brief summary has been provided so that the nature of this disclosure may be understood quickly. A more complete understanding can be obtained by reference to the following detailed description and to the attached drawings.

DETAILED DESCRIPTION

<FIGS. 1 to 4>

Figures 1A, 1B:
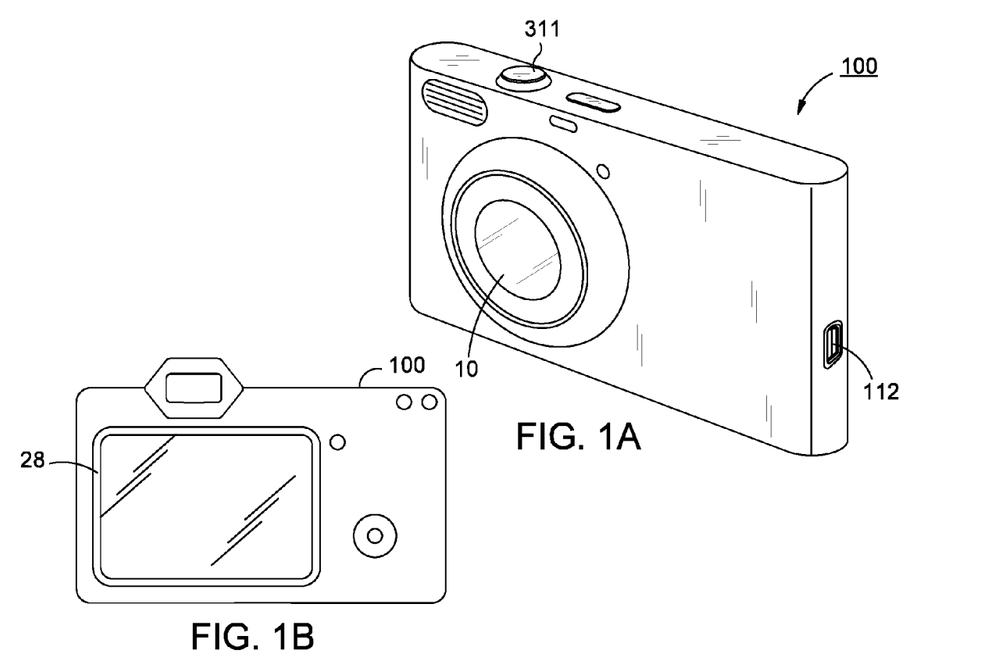
FIGS. 1A and 1B are representative views for explaining the exterior appearance of an image capture device relevant to one example embodiment.

FIGS. 1A and 1B are representative views for explaining the exterior appearance of an image capture device relevant to one example embodiment. Note in these figures, some components are omitted for description purpose. As shown in FIGS. 1A and 1B, image capture device 100 is constructed as an embedded and hand held device including an optical system 10 and a connector 112 for connection to external devices. Optical system 10 comprises, for example, an imaging lens.

In the embodiment of FIGS. 1A and 1B, interface connector 112 is a USB interface connector, but other wired and wireless interfaces may be used.

Image capture device 100 further includes a variety of user interfaces for permitting a user to interact therewith, such as shutter release 311, an image display unit 28 for displaying menus and thumbnail images, and a series of selector buttons for permitting display and selection of menu items.

While FIGS. 1A and 1B depict one example embodiment of image capture device 100, it should be understood that the image capture device 100 may be configured in the form of, for example, a digital camera, a video camera, or any type of device including a camera, such as a pager, a cellular telephone, a radio telephone, a personal computer, a personal digital assistant (PDA), a Moving Pictures Expert Group Layer 3 (MP3) player, and/or the like.

Figure 1C:
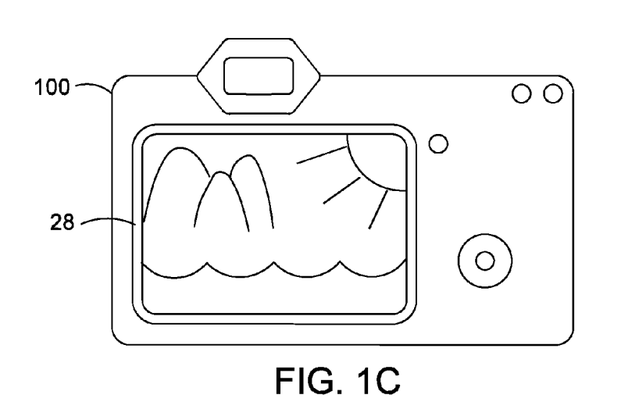
FIG. 1C is a representative view for explaining display of an image by an image capture device relevant to one example embodiment.

FIG. 1C is a view for explaining display of an image by the image capture device shown in FIG. 1 according to this example embodiment. In particular, a rear view of image capture device 100 having image display unit 28 is provided in FIG. 1C. According to this example embodiment, a user interface that includes a sample or preview image based on captured image data of a scene is displayed on the image display unit 28.

In some cases, image data captured by the image capture device 100 and displayed on the image display unit 28 includes regions that include highlights due to specular reflection. In such cases, adjusting settings for the imaging assembly and the imaging optics globally may result in certain areas of the image where there are spectral highlights due to specular reflection that make an image look incorrect or not pleasing from an aesthetic point of view. For example, an image that includes a window may also include glare due to the window's reflection of light. By using a polarization filter tunable in accordance with a polarization control mask, together with a tunable image sensor having a spectral sensitivity tunable in accordance with a spectral capture mask, it is possible to suppress specular reflection while capturing diffuse light, so as to improve the aesthetic quality of a captured image.

Figure 2A:
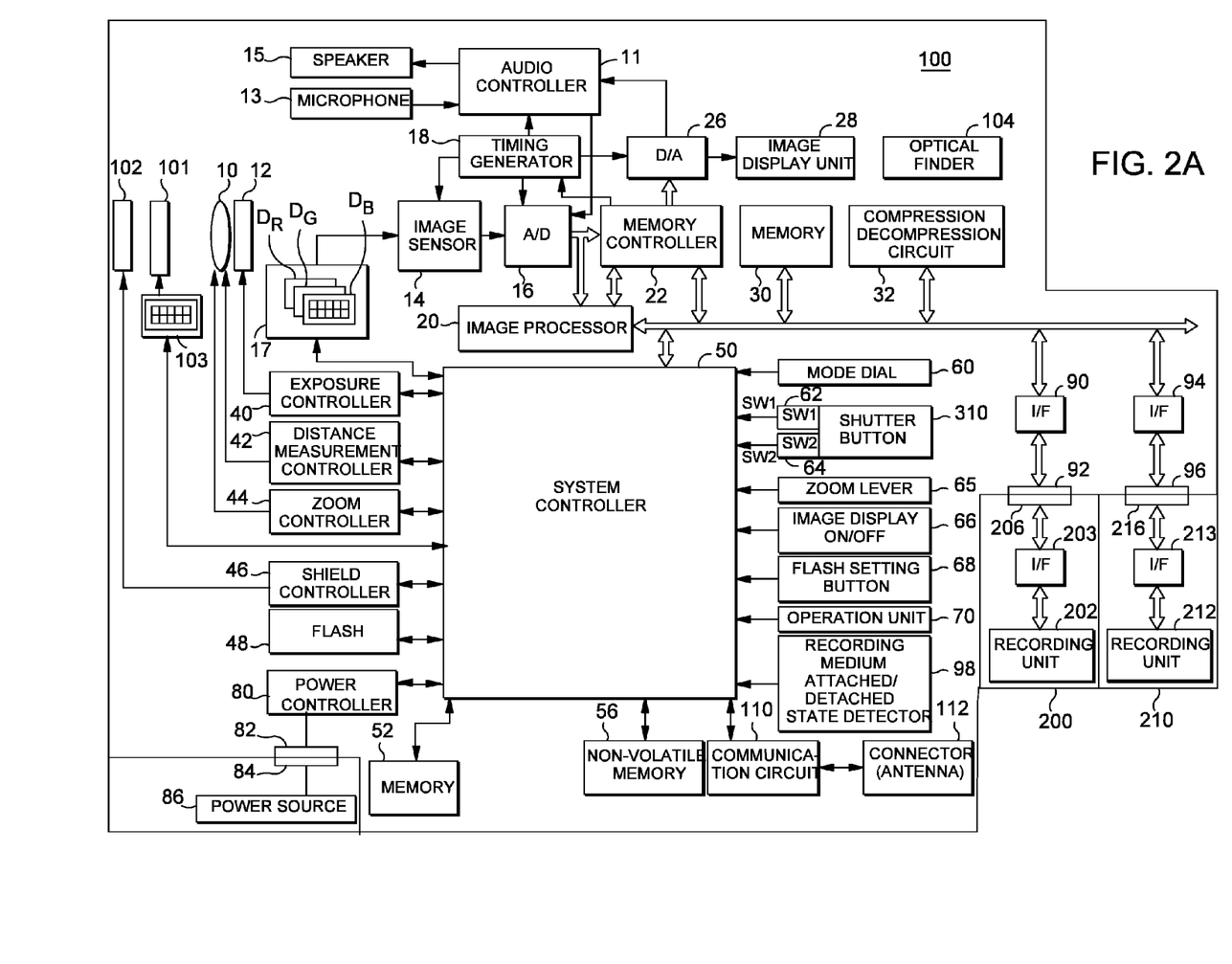
FIGS. 2A and 2B are detailed block diagrams for explaining the internal architecture of the image capture device shown in FIG. 1 according to one example embodiment.

FIG. 2A is a detailed block diagram for explaining the internal architecture of the image capture device 100 shown in FIG. 1 according to one example embodiment. Referring to FIG. 2A, reference numeral 10 denotes an optical system; 12, a shutter having an aperture function; and 14, an image sensor which has a spectral response which is tunable in accordance with a capture setting, which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor and the optical system 10 of the digital camera 100 to prevent an image capturing system including the optical system 10, shutter 12, and image sensor 14 from being contaminated or damaged.

In the embodiment of FIG. 2A, an imaging assembly is comprised of image sensor 14 and associated optics, such that in some embodiments the imaging assembly is comprised of image sensor 14, and imaging optics comprising optical system 10 and polarization filter 101.

Imaging optics of camera 100 includes optical system 10 which may be a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

Imaging optics of camera 100 also includes a polarization filter 101 that is tunable in accordance with a polarization control mask 103. The precise nature of the polarization settings of optical system 10 is controlled via polarization control mask 103, such that the imaging optics is tuned to a specified polarization setting. The polarization control mask comprises an electronic spatial mask, and the spatial mask comprises an array of control parameters corresponding to pixels or regions of pixels in polarization filter 101. For example, the polarization control mask comprises flags that correspond to pixels or regions of pixels in the polarization filter 101, where a flag set to "1" indicates that the filter should be rotated and a flag set to "0" indicates that the filter should not be rotated. The polarization setting of each pixel, or each region of plural pixels, is thus tunable individually and independently of other pixels or regions of pixels.

According to this example embodiment, in order to determine which flags corresponding to pixels or regions of pixels should be set to indicate rotation, two preview images are compared. More specifically, two preview images are captured, one having all flags set to no rotation and the other having all flags set to 90 degrees rotation. By comparing these two preview images, pixels or regions of pixels including unwanted reflections are determined. For example, a difference of the two images is obtained, and the difference is compared with a predetermined threshold. If the difference between the polarized and unpolarized images is larger than the predetermined threshold, it is determined that the pixel or region includes unwanted reflections or flare, and the spatial mask is generated such that the flags corresponding to these pixels or regions of pixels are set to indicate rotation.

In other example embodiments, only one preview image is captured in order to determine which pixels or region of pixels require polarization adjustment. This embodiment may be advantageous in an environment in which the imaging architecture is not fast or does not have a high frame rate. According to this example embodiment, one preview image is captured, and non-polarized and polarized settings are interlaced and interpolated. For example, one preview image can be captured in which the polarization setting of some pixels is set to 90 degrees, and in which the remaining pixels are not polarized. The captured image data is then sampled, and the sampled data is interpolated in order to rebuild an image. Any suitable method of sampling may be used, and multiple samplings may be taken in order to generate multiple images. For example, a first sampling samples data for pixels or regions of pixels having a polarization setting of 90 degrees, and a second sampling samples data for pixels or regions of pixels having a polarization setting of 0 degrees. The sets of sampled data are interpolated, and the resulting images are compared as described above in order to determine the pixels or regions of pixels that include unwanted reflections.

In this example embodiment, the amount of rotation is set to 90 degrees, and is a preset amount. In other example embodiments, arbitrary rotations are applied. In these example embodiments, the amount of rotation can be set by a dial, or the like.

The polarization filter 101 is, in this embodiment, a tunable carbon nanotube polarizer. In other example embodiments, the polarization filter 101 is a tunable field-sensitive polarizer using hybrid waveguides and photonic crystal structures with nematic liquid crystals. Furthermore, in some embodiments, the polarization filter 101 has adjustable micro-polarizers on top of each pixel.

A light beam (light beam incident upon the angle of view of the lens) from an object in a scene that goes through the imaging optics comprising the optical system (image sensing lens) 10 and the polarization filter 101, passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 is an image sensor which has a spectral response which is tunable in accordance with a spectral capture mask 17. For each pixel, image sensor 14 outputs three or more channels of color information, including a red-like channel, a green-like channel and a blue-like channel. The precise nature of the spectral responsivity of image sensor 14 is controlled via spectral capture mask 17, such that the imaging assembly is tuned to a spectral sensitivity having high spectral dimensionality with more than three spectral components. In this embodiment, spectral capture mask 17 may be comprised of multiple spatial masks, with one mask each for each channel of information output by image sensor 14. Thus, in this example, where image sensor 14 outputs three or more channels, spectral capture mask 17 includes a spatial mask DR for the red-like channel of information, a spatial mask DG for the green-like channel of information, and a spatial mask DB for the blue-like channel of information.

Each spatial mask comprises an array of control parameters corresponding to pixels or regions of pixels in image sensor 14. The spectral responsivity of each pixel, or each region of plural pixels, is thus tunable individually and independently of other pixels or regions of pixels.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 311 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
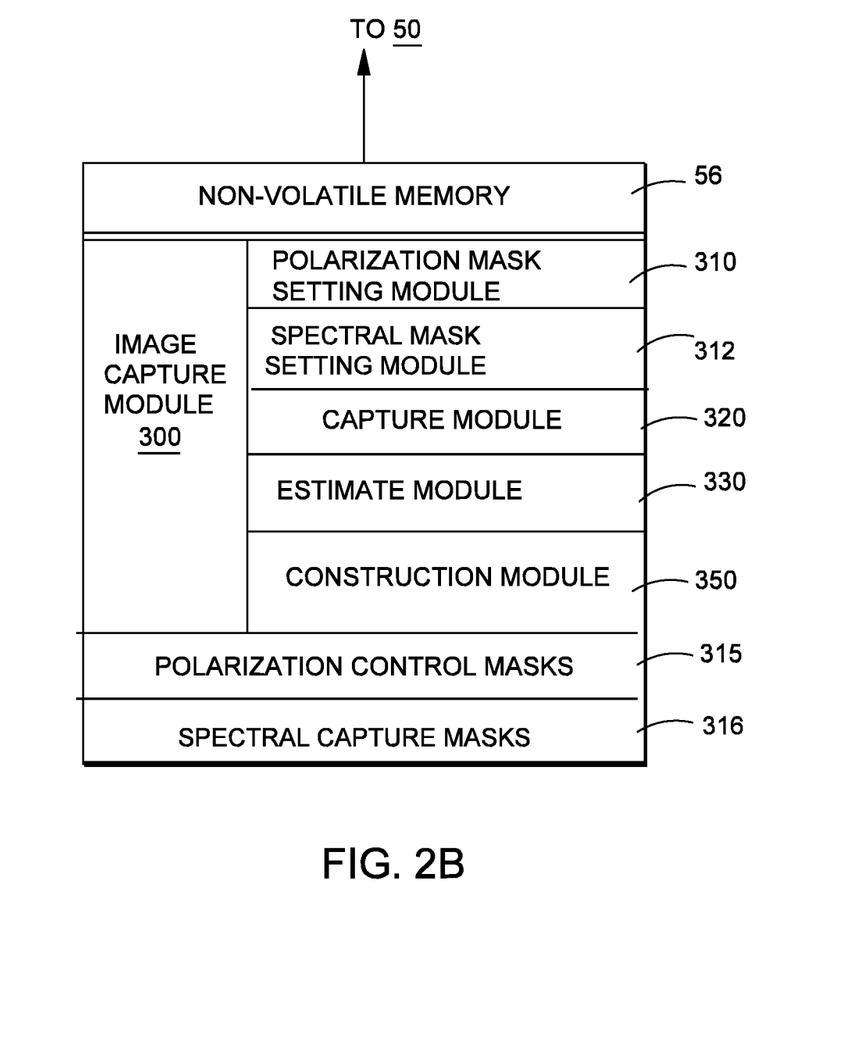

In particular, and as shown in FIG. 2B, non-volatile memory 56 is an example of a non-transitory computer-readable memory medium, having stored thereon image capture module 300 as described herein. According to this example embodiment, the image capture module 300 includes at least a polarization mask setting module 310, a spectral mask setting module 312, a capture module 320, an estimate module 330, and a construction module 350. Briefly, the polarization mask setting module 310 comprises computer-executable process steps executed by a computer for applying a polarization control mask to polarization filter 101 in order to tune the polarization filter 101. The spectral mask setting module 312 comprises computer-executable process steps executed by a computer for applying a spectral capture mask to the image sensor 14 in order to set the spectral response of the tunable imaging assembly to a setting. The capture module 320 comprises computer-executable process steps executed by a computer for capturing image data of a scene from the image sensor 14 using the capture setting. The estimate module 330 comprises computer-executable process steps executed by a computer for estimating the spectral content of a scene. The construction module 350 comprises computer-executable process steps executed by a computer for constructing an updated polarization control mask and an updated spectral capture mask based on calculations using the estimated spectral content of the scene. These modules will be discussed in more detail below with respect to FIG. 3.

Also stored on non-volatile memory 56 are polarization control masks 315 for application to polarization filter 101 so as to control the polarization of the optical system, and pre-designated spectral capture masks 316 for application to image sensor 14 so as to control spectral responsivity of the imaging assembly. In this embodiment, the polarization control masks 315 and the spectral capture masks 316 are comprised of spatial masks so as to permit pixel-by-pixel or region-by-region control of polarization and spectral responsivity, respectively, independently of other pixels or regions.

In FIG. 2A, reference numeral 50 denotes a system controller, which controls the entire digital camera 100. The system controller 50 executes programs recorded in the aforementioned nonvolatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as a NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the optical system 10 utilizing prisms and mirrors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3:
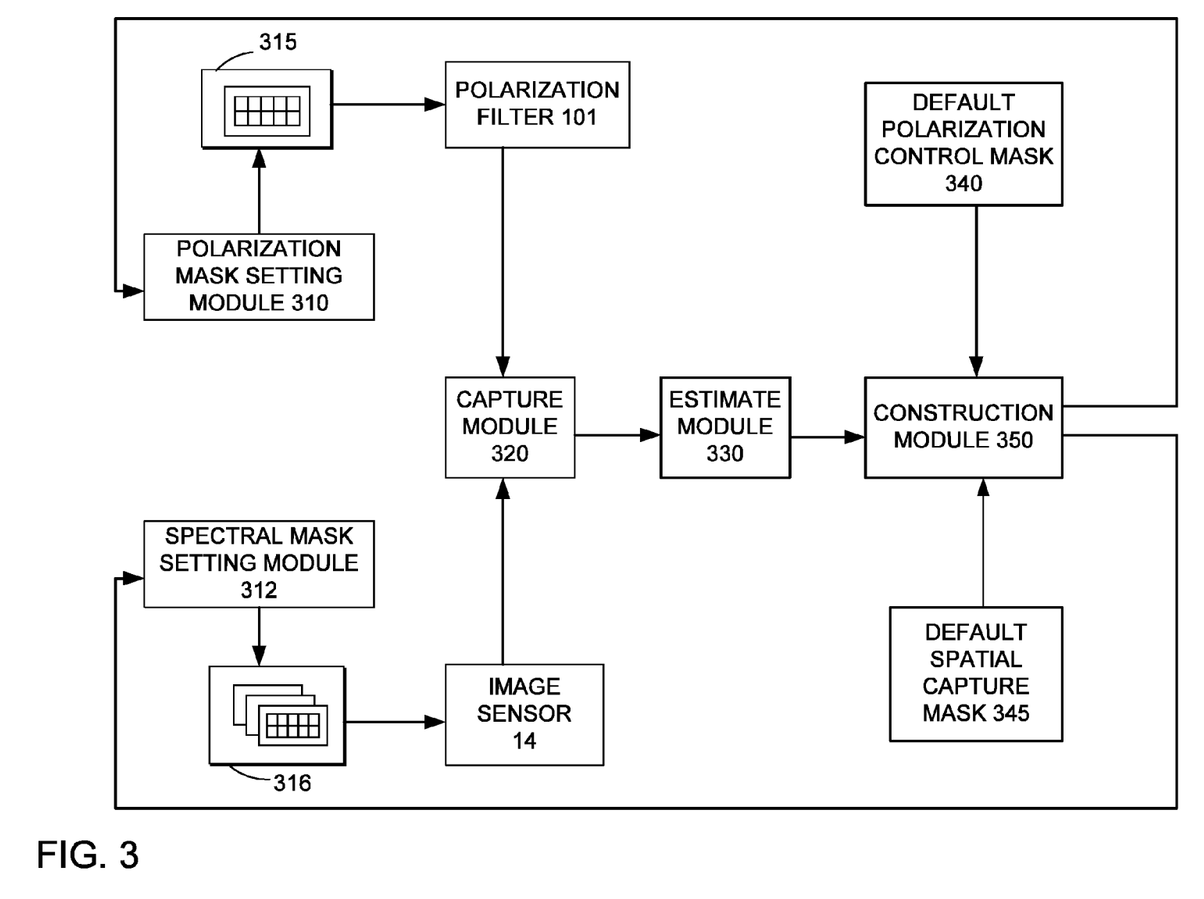
FIG. 3 is a view for explaining software architecture of the image capture device shown in FIG. 1 according to one example embodiment.

FIG. 3 is a view for explaining software architecture of the image capture device 100 of FIGS. 1A and 1B according to one example embodiment. As previously discussed with respect to FIG. 2B, image capture module 300 comprises computer-executable process steps stored on a non-transitory computer-readable storage medium, such as non-volatile memory 56. In this example embodiment, as shown in FIG. 3, image capture module 300 includes computer-executable process steps for at least the polarization mask setting module 310, the spectral mask setting module 312, the capture module 320, the estimate module 330, and the construction module 350.

The polarization mask setting module 310 is constructed to apply a polarization control mask 315 to the tunable polarization filter 101 of the imaging optics, so as to set the polarization of the tunable polarization filter 101 to a setting. More specifically, in this example embodiment, polarization mask setting module 310 applies a default polarization control mask to the tunable polarization filter 101 in order to implement a predesignated default setting such as 90 degree polarization filter, and applies an updated polarization control mask to the tunable polarization filter 101 in order to set the polarization of the imaging optics to a revised setting. In this example embodiment, the default polarization control mask and the updated polarization control mask both comprise an electronic spatial mask, and the updated polarization control mask comprises an electronic spatial mask with differing polarization in different regions or pixels of the mask.

The spectral mask setting module 312 is constructed to apply a spectral capture mask 316 to the tunable image sensor 14 for setting the spectral response of the imaging assembly to a setting. More specifically, for example, spectral mask setting module 312 applies a default spectral capture mask to the tunable image sensor 14 for setting the spectral response of the tunable imaging assembly to a predesignated default setting. For example, the predesignated default setting controls the imaging assembly to produce a spatially uniform response when illuminated by a perfectly diffuse illumination. The spectral mask setting module 312 also applies an updated spectral capture mask to the tunable image sensor 14 for setting the spectral response of the imaging assembly to a revised setting. In this example embodiment, the default spectral capture mask and the updated spectral capture mask both comprise an electronic spatial mask, and the updated spectral capture mask comprises an electronic spatial mask with differing spectral responsivity settings in different regions of the mask.

The capture module 320 is constructed to capture image data of a scene from the image sensor 14 using the spectral capture mask 316 applied by the spectral mask setting module 312, with the polarization control mask 315 applied to the polarization filter 101. Image data that is captured by the image sensor 14 is stored in memory 30. More specifically, for example, sample image data of a scene from the image sensor 14 is captured using the default spectral capture mask and the default polarization control mask, and updated image data from the image sensor 14 is captured using the updated spectral capture mask and the updated polarization control mask. In this example embodiment, the default spectral capture setting is a predesignated default setting such as 90 degree polarization filter, and the default spectral capture setting is a predesignated default setting that controls the imaging assembly to produce a spatially uniform response when illuminated by a perfectly diffuse illumination. In other embodiments, the default settings are provided by any of the manufacturers of the image sensor 14, the optical system 10 and the polarization filter 101. In other example embodiments, the default settings are provided in any suitable manner, including, for example, by user specification.

The estimate module 330 is constructed to estimate spectral content of a scene based on a captured image. For example, the capture module captures at least one sample image of a scene, and the at least one sample image is used to estimate the spectral image based on pre-calculated basis vectors such as eigenvectors and transformations from digital signals to reflectance spectra. In this example embodiment, the basis vectors comprise eigenvectors that are generated by performing eigenvector analysis of a training set of eigenvectors that represent the scene of the image. For example, a training set comprises a sample of the spectral reflectance data of the scene, such that image capture module 300 is trained and basis vectors are generated in accordance with the responsivity of the image capture device. The pre-calculated transformations are used to calculate coefficients for the eigenvectors, and are generated by capturing an image of calibration targets having known reflectance spectra, and calculating an inverse transformation that provides a relationship between the reflectance spectra and digital signals. For example, the transformation is obtained using the Moore-Penrose pseudoinverse. In other examples, the transformation is obtained by using a Wiener estimation, or neural networks, and the like. Thus, coefficients for the basis vectors are generated using the transformations, in accordance with the responsivity of the image capture device.

In this embodiment, estimate module 330 estimates spectral content of the scene, and determines pixels or regions of pixels including specular reflection for polarization adjustment. In particular, it is determined whether each pixel or region of pixels has an intensity value above or below a predetermined threshold. For example, the threshold is a percentile, and any pixel or region of pixels having an intensity value above the threshold is determined to be a region including specular reflection for polarization adjustment.

In other example embodiments, estimate module 330 identifies regions including specular reflection scene based on a comparison of two captured images. More specifically, two images are captured in sequence, one using a polarization control mask that is rotated 90 degrees, the other using a polarization control mask that is not rotated 90 degrees, and both using the same spectral capture masks. Based on the differences between the intensities of the respective pixels or regions of pixels of the two images, regions that include highlight for polarization adjustment are determined. For example, if a difference in the intensity values for corresponding pixels or regions of pixels in the first and second images is greater than a predetermined threshold, the pixel or region of pixels is determined to be an area including specular reflection for polarization adjustment. On the other hand, if the difference is equal to or lower than a predetermined threshold, the pixel or region of pixels is not determined to be an area including highlight.

In some example embodiments, the estimate module 330 estimates spectral content of a scene, and the image data of the scene is segmented into regions. For example, if it is determined, based on the estimated spectral content, that a group of neighboring pixels has a similar intensity value, the group of pixels is identified as a region. According to this embodiment, flags which comprise the polarization control mask are set for each region, rather than for each pixel. Accordingly, the identification of pixels or regions of pixels including specular reflection is facilitated.

The construction module 350 is constructed to construct an updated polarization mask and an updated spectral capture mask based at least in part on calculations using estimated spectral content of a scene. For example, in this example embodiment, the construction module 350 also uses the default polarization control mask 340 and the default spectral capture mask 345 to construct the updated polarization mask and the updated spectral capture mask.

In some example embodiments, the estimate module 330 further comprises a polarization determination module, an identification module and a spectral determination module. The polarization determination module is constructed to determine a polarization adjustment based at least in part on calculations using at least one sample image captured by the capture module 320. In some of these embodiments, the polarization determination module determines the polarization adjustment so as to determine a polarization angle for suppression of specular reflection. The identification module is constructed to identify multiple different regions in the scene, each such region sharing similar spectral content that is dissimilar from spectral content in other regions of the scene, at least in part based on calculations using the sample image.

The spectral determination module is constructed to determine spectral bands for each region of the multiple different regions, the spectral bands being determined so as to increase spectral differentiation for spectral content in each such region. See U.S. patent application Ser. No. 12/949,592 titled "Adaptive Spectral Imaging By Using An Imaging Assembly With Tunable Spectral Sensitivities", filed Nov. 18, 2010 by Francisco Imai, the contents of which are incorporated herein by reference.

In these example embodiments, the construction module 350 further comprises a polarization mask construction module constructed to construct an updated polarization control mask based at least in part on calculations using the polarization adjustment, and a spectral mask construction module constructed to construct an updated spectral capture mask based at least in part on calculations using the spectral bands for the multiple different regions.

Figure 4:
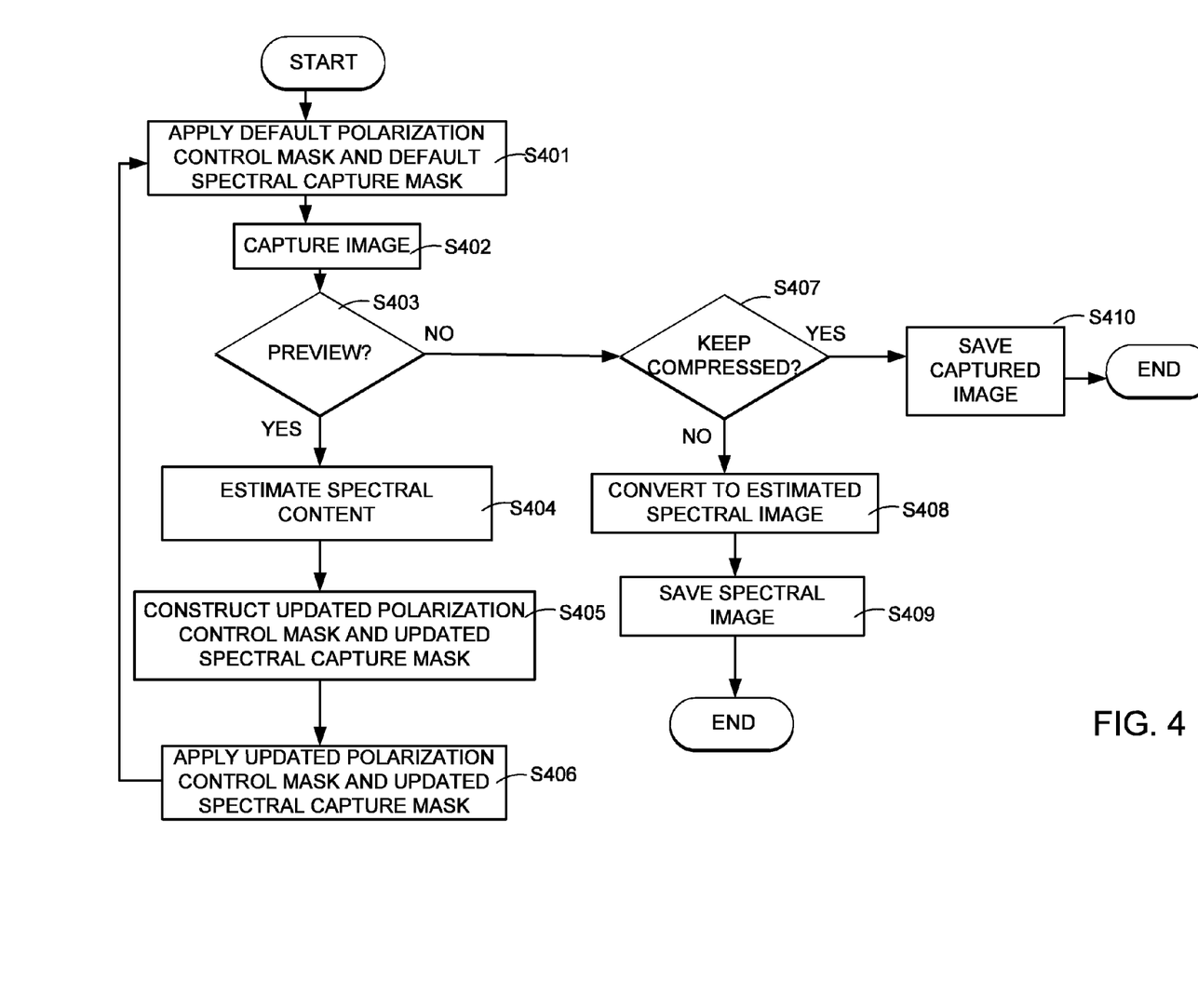
FIG. 4 is a flow diagram for explaining processing in the image capture device shown in FIG. 1 according to one example embodiment.

FIG. 4 is a flow diagram for explaining processing in the image capture device shown in FIGS. 1A to 1C according to this example embodiment. Briefly, according to FIG. 4, a default polarization control mask to the imaging optics, and a default spectral capture mask to the imaging assembly. An image of the scene is captured using the imaging assembly. Spectral content of the scene is estimated based on the captured sample image, and an updated polarization control mask and an updated spectral capture mask are constructed based at least in part on calculations using the estimated spectral content of the scene. The updated polarization control mask is applied to the imaging optics and the updated spectral capture mask is applied to the imaging assembly. The capture module captures the image of the scene with the updated polarization control mask applied to the imaging optics and with the updated spectral capture mask applied to the imaging assembly.

In more detail, the process shown in FIG. 4 starts with application of a default polarization control mask and a default spectral capture mask, then capturing an image using the default masks. The image is captured and displayed on the image display unit 28 by a half stroke of shutter switch (SW1) 62 before the shutter switch (SW2) 64 is switched on by a full stroke of the shutter button by a user of the image capture device 100.

As shown in FIG. 4, in step S401, the polarization mask setting module 310 applies a default polarization control mask to the tunable polarization filter 101, and the spectral mask setting module 312 applies a default spectral capture mask to the tunable image sensor 14 for setting the spectral response of the tunable imaging assembly to a predesignated default setting.

In step S402, capture module 320 captures image data of a scene from the image sensor 14 using the default spectral capture mask applied by the spectral mask setting module 312, with the default polarization control mask applied by the polarization mask setting module 310, according to this example embodiment.

In step S403, it is determined whether the image capture is a preview. In this example embodiment, the determination is based on user input. If it is determined that the image capture is a preview ("YES" at S403), estimate module 330 estimates spectral content of the scene based on the captured image in step S404. More specifically, the estimate module 330 uses the captured image to estimate the spectral image based on pre-calculated basis vectors and transformations from digital signals to reflectance spectra. Based on the estimated spectral content, pixels or regions of pixels that include specular reflection are identified. In order to reduce such specular reflection in the identified regions, the updated polarization control mask controls the polarization filter such pixels corresponding to the identified pixels are rotated by 90 degrees.

In step S405, construction module 350 constructs an updated polarization control mask and an updated spectral capture mask, and in step S406 the updated masks are applied to the tunable polarization filter 101 and the tunable image sensor 14, respectively. The capture module 320 then captures an image with the updated polarization control mask applied to the tunable polarization filter 101 and with the updated spectral capture mask applied to the image sensor 14.

If it is determined that the image capture is not a preview ("NO" in step S403), it is determined in step S407 whether the captured image should remain compressed. In this example embodiment, the determination is based on user input. If it is determined that the image is to remain compressed ("YES" in step S407), the captured image is stored in step S410.

On the other hand, if its determined that the image is not to remain compressed ("NO" in step S407), the captured image is converted to an estimated spectral image in step S408, and the estimated spectral image is stored in step S409. More specifically, the basis vectors and transformations that are used by the estimate module 330 are also used to render the estimated spectral image, and the spectral image is stored.

Figure 5:
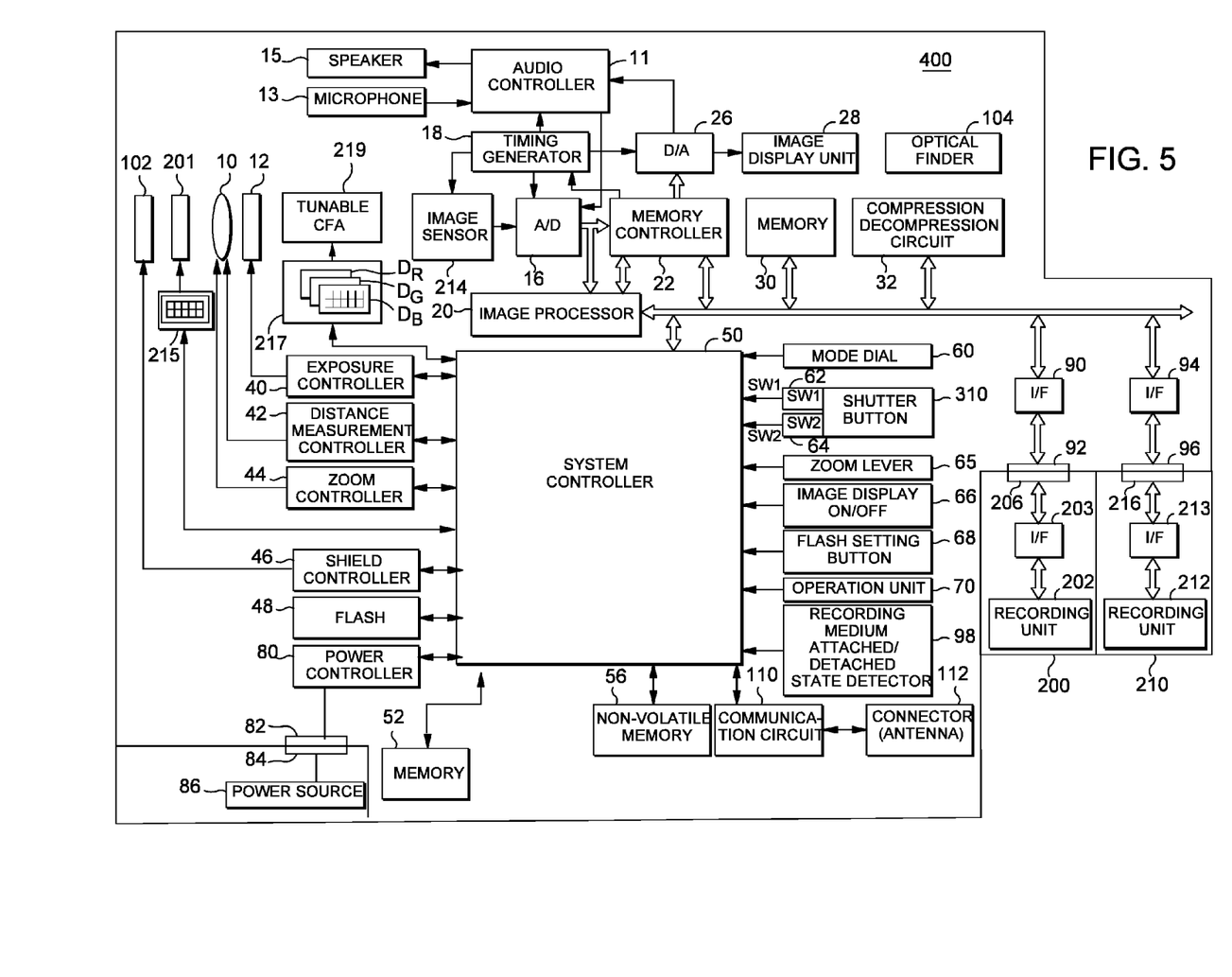
FIG. 5 is a detailed block diagram for explaining the internal architecture of an image capture device according to one example embodiment.

<FIG. 5>

FIG. 5 is a detailed block diagram for explaining the internal architecture of an image capture device 400 according to a second example embodiment. In the embodiment of FIG. 5, parts and features that are largely similar to those of the example embodiment of FIG. 2A are illustrated with like reference numerals, and a detailed explanation thereof is omitted in the interest of brevity.

One way that the embodiment of FIG. 5 differs from the embodiment of FIG. 2A concerns the construction of the tunable imaging assembly. In the embodiment of FIG. 2A, the tunable imaging assembly includes tunable image sensor 14, in combination with imaging optics comprising optical system 10 and polarization filter 101. Because the image sensor 14 in the embodiment of FIG. 2A itself has a tunable spectral response, it is customary to omit a preceding color filter array, since the inclusion of any filter necessarily would decrease the signal-to-noise ratio by filtering the amount of light incident on image sensor 14.

In contrast, in the embodiment of FIG. 5, the spectral responsivity of image sensor 214 is not necessarily tunable, but rather the spectral responsivity of a preceding color filter array 219 is. Thus, in the example embodiment of FIG. 5, the imaging assembly is comprised of tunable color filter array (CFA) 219 and image sensor 214, in combination with imaging optics comprising optical system 10 and polarization filter 201. In the embodiment of FIG. 5, image sensor 214 is not necessarily tunable, although in other embodiments it might be.

Turning more specifically to the embodiment of FIG. 5, a light beam (light beam incident upon the angle of view of the lens) from an object in a scene that goes through the imaging optics comprising the optical system (image sensing lens) 10 and the polarization filter 201 tuned in accordance with a polarization control mask 215, passes through an opening of a shutter 12 having a diaphragm function, is filtered by tunable color filter array 219, and forms an optical image of the object on the image sensing surface of image sensor 214. The image sensor 214 converts the optical image to analog image signals and outputs the signals to an A/D converter 16. The A/D converter 16 converts the analog image signal to digital image signals (image data).

Tunable color filter array 219 may be a spatial color filter array, such as a color filter array having a spatial distribution of a repeating pattern of filter elements. In this case, image data output from image sensor 214 is demosaiced, so as to result in output of a red-like channel for each pixel, a green-like channel for each pixel, and a blue-light channel for each pixel. Alternatively, tunable color filter array 219 might be a temporal color filter array, in which case the color filter quickly and sequentially changes spectral responsivity, with image data collected by image sensor 214 after each change. In this case, the sequential outputs of image sensor 214 are collected so as to result in output signals for each pixel for a red-like channel, a green-like channel, and a blue-light channel.

The spectral responsivity of tunable color filter array 219 is tunable in accordance with a spectral capture mask 217. In this embodiment, the spectral capture mask 217 may be comprised of multiple spatial masks, with one mask for each channel of information output by image sensor 214, namely, the aforementioned red-like channel, green-like channel, and blue-light channel. Thus, in this example where image sensor 214 outputs three or more channels, spectral capture mask 217 includes a spatial mask DR for the red-like channel of information, a spatial mask DG for the green-like channel of information, and a spatial mask DB for the blue-light channel of information. Each spatial mask comprises an array of control parameters applied to the tunable color filter array 219 in correspondence to pixels or regions of pixels in image sensor 214. The resulting spectral responsivity of each pixel, or each region of plural pixels, is thus tunable individually and independently of other pixels or regions of pixels, by virtue of the spectral capture mask 217 imposed on tunable color filter array 219.

Tunable color filter array 219 may be comprised of a tunable color filter array as described in U.S. Pat. No. 6,466,961 by Miller, mentioned hereinabove. Spatial masks DR, DG and DB may correspond to voltage biases applied to control electrodes of the tunable color filter array 219.

<Other Embodiments>

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method of diffuse spectral imaging for use in an image capture device, wherein the image capture device includes an imaging assembly having a spectral sensitivity tunable on a region-by-region basis in accordance with a spectral capture mask, and imaging optics having a polarization filter tunable on a region-by-region basis in accordance with a polarization control mask for projecting an image of a scene onto the imaging assembly, wherein a region in the image is a pixel or a contiguous group of pixels, the method comprising:

applying a default polarization control mask to the imaging optics, wherein the default polarization control mask indicates a setting for each region regarding whether or not to rotate the imaging optics;

applying a default spectral capture mask to the imaging assembly, wherein the default spectral capture mask indicates a setting for a spectral sensitivity of each region;

capturing an image of the scene using the imaging assembly;

capturing at least one sample image of the scene;
estimating spectral content of the scene based on the captured sample image;
constructing an updated polarization control mask and an updated spectral capture mask based at least in part on calculations using the estimated spectral content of the scene;
applying the updated polarization control mask to the imaging optics; and
applying the updated spectral capture mask to the imaging assembly,
wherein in the capturing step, the image of the scene is captured with the updated polarization control mask applied to the imaging optics and with the updated spectral capture mask applied to the imaging assembly.

2. The method for diffuse spectral imaging according to claim 1, wherein the spectral capture mask tunes the imaging assembly to a spectral sensitivity having high spectral dimensionality with more than three spectral components.

3. The method for diffuse spectral imaging according to claim 1, wherein the imaging assembly comprises an image sensor which has a tunable spectral response.

4. The method for diffuse spectral imaging according to claim 1, wherein the imaging assembly comprises an image sensor and a preceding color filter array which has a tunable spectral response.

5. The method for diffuse spectral imaging according to claim 1, wherein the imaging optics is comprised by a tunable carbon nanotube polarizer.

6. The method for diffuse spectral imaging according to claim 1, wherein the imaging optics is comprised by a tunable field-sensitive polarizer using hybrid waveguides and photonic crystal structures with nematic liquid crystals.

7. A method of diffuse spectral imaging for use in an image capture device, wherein the image capture device includes an imaging assembly having a spectral sensitivity tunable in accordance with a spectral capture mask, and imaging optics having a polarization filter tunable in accordance with a polarization control mask for projecting an image of a scene onto the imaging assembly, the method comprising:
    applying a default polarization control mask to the imaging optics;
    applying a default spectral capture mask to the imaging assembly;
    capturing an image of the scene using the imaging assembly;
    capturing at least one sample image of the scene;
    estimating spectral content of the scene based on the captured sample image;
    constructing an updated polarization control mask and an updated spectral capture mask based at least in part on calculations using the estimated spectral content of the scene;
    applying the updated polarization control mask to the imaging optics; and
    applying the updated spectral capture mask to the imaging assembly,
    wherein the image of the scene is captured with the updated polarization control mask applied to the imaging optics and with the updated spectral capture mask applied to the imaging assembly, and
    wherein in estimating spectral content of the scene, the captured sample image of a scene is used to estimate the spectral image based on pre-calculated basis vectors and transformations from digital signals to reflectance spectra.

8. The method for diffuse spectral imaging according to claim 7, wherein the basis vectors are eigenvectors.

9. A method of diffuse spectral imaging for use in an image capture device, wherein the image capture device includes an imaging assembly having a spectral sensitivity tunable in accordance with a spectral capture mask, and imaging optics having a polarization filter tunable in accordance with a polarization control mask for projecting an image of a scene onto the imaging assembly, the method comprising:
    applying a default polarization control mask to the imaging optics;
    applying a default spectral capture mask to the imaging assembly;
    capturing an image of the scene using the imaging assembly;
    capturing at least one sample image of the scene;
    determining a polarization adjustment based at least in part on calculations using the sample image;
    constructing an updated polarization control mask based at least in part on calculations using the polarization adjustment;
    identifying multiple different regions in the scene, wherein each such region shares similar spectral content that is dissimilar from spectral content in other regions of the scene, at least in part on calculations using the sample image;
    determining spectral bands for each region of the multiple different regions, wherein the spectral bands are determined so as to increase spectral differentiation for spectral content in each such region;
    constructing an updated spectral capture mask based at least in part on calculations using the spectral bands for the multiple different regions;
    applying the updated polarization control mask to the imaging optics; and
    applying the updated spectral capture mask to the imaging assembly,
    wherein the image of the scene is captured with the updated polarization control mask applied to the imaging optics and with the updated spectral capture mask applied to the imaging assembly.

10. A method of diffuse spectral imaging for use in an image capture device, wherein the image capture device includes an imaging assembly having a spectral sensitivity tunable on a region-by-region basis in accordance with a spectral capture mask, and imaging optics having a polarization filter tunable on a region-by-region basis in accordance with a polarization control mask for projecting an image of a scene onto the imaging assembly, wherein a region in the image is a pixel or a contiguous group of pixels, the method comprising:
    applying a default polarization control mask to the imaging optics, wherein the default polarization control mask indicates a setting for each region regarding whether or not to rotate the imaging optics;
    applying a default spectral capture mask to the imaging assembly, wherein the default spectral capture mask indicates a setting for a spectral sensitivity of each region; and
    capturing an image of the scene using the imaging assembly,
    wherein in the step of applying a default polarization control mask to the imaging optics, the default polarization control mask controls the imaging optics so as to implement a 90° polarization filter;
    wherein in the step of applying a default spectral capture mask to the imaging assembly, the default spectral capture mask controls the imaging assembly to produce a spatially uniform response when illuminated by a perfectly diffuse illumination;

wherein the method further comprises:

capturing at least one sample image of the scene using the imaging assembly;

determining a polarization adjustment based at least in part on calculations using the sample image, so as to determine a polarization angle for suppression of specular reflection;

constructing an updated polarization control mask based at least in part on calculations using the polarization adjustment;

identifying multiple different regions in the scene, wherein each such region shares similar spectral content that is dissimilar from spectral content in other regions of the scene, at least in part on calculations using the sample image;

determining spectral bands for each region of the multiple different regions, wherein the spectral bands are determined so as to increase spectral differentiation for spectral content in each such region;

constructing an updated spectral capture mask based at least in part on calculations using the spectral bands for the multiple different regions;

applying the updated polarization control mask to the imaging optics; and applying the updated spectral capture mask to the imaging assembly, wherein in the step of capturing an image of the scene, the image of the scene is captured with the updated polarization control mask applied to the imaging optics and with the updated spectral capture mask applied to the imaging assembly.

11. A method of diffuse spectral imaging according to claim 10, wherein the polarization angle is determined to be 90 degrees.

12. An image capture module for use with an image capture device that includes an imaging assembly having a spectral sensitivity tunable on a region-by-region basis in accordance with a spectral capture mask, and imaging optics having a polarization filter tunable on a region-by-region basis in accordance with a polarization control mask for projecting an image of a scene onto the imaging assembly, wherein a region in the image is a pixel or a contiguous group of pixels, the module comprising:

a polarization mask setting module constructed to apply a default polarization control mask to the imaging optics, wherein the default polarization control mask indicates a setting for each region regarding whether or not to rotate the imaging optics;

a spectral mask setting module constructed to apply a default spectral capture mask to the imaging assembly, wherein the default spectral capture mask indicates a setting for a spectral sensitivity of each region;

a capture module constructed to capture an image of the scene using the imaging assembly, wherein the capture module is further constructed to capture at least one sample image of the scene;

an estimation module constructed to estimate spectral content of the scene based on the captured sample image; and a construction module constructed to construct an updated polarization control mask and an updated spectral capture mask based at least in part on calculations using the estimated spectral content of the scene, wherein the polarization mask setting module is further constructed to apply the updated polarization control mask to the imaging optics, wherein the spectral mask setting module is further constructed to apply the updated spectral capture mask to the imaging assembly, and wherein the capture module captures the image of the scene with the updated polarization control mask applied to the imaging optics and with the updated spectral capture mask applied to the imaging assembly.

13. An image capture device that includes an imaging assembly having a spectral sensitivity tunable on a region-by-region basis in accordance with a spectral capture mask, and imaging optics having a polarization filter tunable on a region-by-region basis in accordance with a polarization control mask for projecting an image of a scene onto the imaging assembly, wherein a region in the image is a pixel or a contiguous group of pixels, the image capture device comprising:

a computer-readable memory constructed to store computer-executable process steps; and a processor constructed to execute the computer-executable process steps stored in the memory;

wherein the process steps stored in the memory include computer-executable process steps to:

apply a default polarization control mask to the imaging optics, wherein the default polarization control mask indicates a setting for each region regarding whether or not to rotate the imaging optics;

apply a default spectral capture mask to the imaging assembly, wherein the default spectral capture mask indicates a setting for a spectral sensitivity of each region;

capture an image of the scene using the imaging assembly;

capture at least one sample image of the scene;

estimate spectral content of the scene based on the captured sample image;

construct an updated polarization control mask and an updated spectral capture mask based at least in part on calculations using the estimated spectral content of the scene;

apply the updated polarization control mask to the imaging optics; and apply the updated spectral capture mask to the imaging assembly, wherein in the capturing step, the image of the scene is captured with the updated polarization control mask applied to the imaging optics and with the updated spectral capture mask applied to the imaging assembly.

14. The image capture device according to claim 13, wherein in estimating spectral content of the scene, the captured sample image of a scene is used to estimate the spectral image based on pre-calculated basis vectors and transformations from digital signals to reflectance spectra.

15. The image capture device according to claim 14, wherein the basis vectors are eigenvectors.

16. The image capture device according to claim 13, wherein the process steps further comprise process steps to:

determine a polarization adjustment based at least in part on calculations using the sample image;

construct the updated polarization control mask based at least in part on calculations using the polarization adjustment;

identify multiple different regions in the scene, wherein each such region shares similar spectral content that is dissimilar from spectral content in other regions of the scene, at least in part on calculations using the sample image;

determine spectral bands for each region of the multiple different regions, wherein the spectral bands are determined so as to increase spectral differentiation for spectral content in each such region; and construct the updated spectral capture mask based at least in part on calculations using the spectral bands for the multiple different regions.

17. The image capture device according to claim 13, wherein the spectral capture mask tunes the imaging assembly to a spectral sensitivity having high spectral dimensionality with more than three spectral components.

18. The image capture device according to claim 13, wherein the imaging assembly comprises an image sensor which has a tunable spectral response.

19. The image capture device according to claim 13, wherein the imaging assembly comprises an image sensor and a preceding color filter array which has a tunable spectral response.

20. The image capture device according to claim 13, wherein the imaging optics is comprised by a tunable carbon nanotube polarizer.

21. The image capture device according to claim 13, wherein the imaging optics is comprised by a tunable field-sensitive polarizer using hybrid waveguides and photonic crystal structures with nematic liquid crystals.

22. The image capture device according to claim 13, wherein the imaging assembly is comprised of an array of pixels, and wherein the imaging optics is comprised of adjustable micro-polarizers on top of each pixel.

23. The image capture device according to claim 13,
wherein in the step of applying a default polarization control mask to the imaging optics, the default polarization control mask controls the imaging optics so as to implement a 90° polarization filter;
wherein in the step of applying a default spectral capture mask to the imaging assembly, the default spectral capture mask controls the imaging assembly to produce a spatially uniform response when illuminated by a perfectly diffuse illumination;
wherein the process steps further comprise process steps to:
determine a polarization adjustment based at least in part on calculations using the sample image, so as to determine a polarization angle for suppression of specular reflection;
construct the updated polarization control mask based at least in part on calculations using the polarization adjustment;
identify multiple different regions in the scene, wherein each such region shares similar spectral content that is dissimilar from spectral content in other regions of the scene, at least in part on calculations using the sample image;
determine spectral bands for each region of the multiple different regions, wherein the spectral bands are determined so as to increase spectral differentiation for spectral content in each such region; and
construct the updated spectral capture mask based at least in part on calculations using the spectral bands for the multiple different regions.

24. The image capture device according to claim 23, wherein the polarization angle is determined to be 90 degrees.

25. A non-transitory computer-readable memory medium on which is stored computer-executable process steps for causing a computer to perform a method of diffuse spectral imaging for use in an image capture device, wherein the image capture device includes an imaging assembly having a spectral sensitivity tunable on a region-by-region basis in accordance with a spectral capture mask, and imaging optics having a polarization filter tunable on a region-by-region basis in accordance with a polarization control mask for projecting an image of a scene onto the imaging assembly, wherein a region in the image is a pixel or a contiguous group of pixels, the process steps comprising:
applying a default polarization control mask to the imaging optics, wherein the default polarization control mask indicates a setting for each region regarding whether or not to rotate the imaging optics;
applying a default spectral capture mask to the imaging assembly, wherein the default spectral capture mask indicates a setting for a spectral sensitivity of each region;
capturing an image of the scene using the imaging assembly;
capturing at least one sample image of the scene;
estimating spectral content of the scene based on the captured sample image;
constructing an updated polarization control mask and an updated spectral capture mask based at least in part on calculations using the estimated spectral content of the scene;
applying the updated polarization control mask to the imaging optics; and
applying the updated spectral capture mask to the imaging assembly,
wherein in the capturing step, the image of the scene is captured with the updated polarization control mask applied to the imaging optics and with the updated spectral capture mask applied to the imaging assembly.

* * * * *